US010766556B2

(12) United States Patent
Williams

(10) Patent No.: US 10,766,556 B2
(45) Date of Patent: Sep. 8, 2020

(54) PANNIER MOUNT

(71) Applicant: Triumph Designs Limited, Leicestershire (GB)

(72) Inventor: Hugh A. Williams, Leicestershire (GB)

(73) Assignee: Triumph Designs Limited, Leicestershire (GB)

( * ) Notice: Subject to any disclaimer, the term of this patent is extended or adjusted under 35 U.S.C. 154(b) by 0 days.

(21) Appl. No.: 16/141,105

(22) Filed: Sep. 25, 2018

(65) Prior Publication Data
US 2019/0092410 A1  Mar. 28, 2019

(30) Foreign Application Priority Data

Sep. 27, 2017 (GB) .................................. 1715655.5

(51) Int. Cl.
*B62J 9/20* (2020.01)
*B62J 9/00* (2020.01)

(52) U.S. Cl.
CPC .. *B62J 9/20* (2020.02); *B62J 9/00* (2013.01)

(58) Field of Classification Search
CPC ..... B62J 9/001; B62J 9/006; B62J 9/00; B62J 9/02; B62J 9/003; B62J 9/005; B62J 9/008; B62J 7/04; B62J 7/02; B62J 7/08; B62J 9/20
USPC ................. 224/413, 429–430, 441, 443, 445
See application file for complete search history.

(56) References Cited

U.S. PATENT DOCUMENTS 2,539,381 A * 1/1951 Bachmann ................ B62J 7/04
224/446
2,776,790 A * 1/1957 Zbikowski ................ B62J 7/02
224/443
3,625,405 A * 12/1971 Kezar ........................ B62J 9/00
224/413
3,934,770 A 1/1976 Larsen
5,484,090 A 1/1996 Lyshkov
7,025,236 B1 4/2006 Naujock
7,931,176 B1 4/2011 Wenom, Jr.
(Continued)

FOREIGN PATENT DOCUMENTS

EP    0240612 A2   10/1987
GB     653768 A     5/1951
(Continued)

OTHER PUBLICATIONS

GB Search Report issued by IPO in connection with GB1715655.5 dated Mar. 8, 2018.
(Continued)

*Primary Examiner* — Scott T McNurlen
(74) *Attorney, Agent, or Firm* — Levenfeld Pearlstein, LLC

(57) ABSTRACT

A pannier mount assembly for attachment to a motorcycle frame comprises a first member attachable to the frame, the first member comprising a first pannier fixture point. The pannier mount assembly also comprises a second member comprising an elongate arm pivotably attached to the first member and comprising a second pannier fixture point. The second member has a free end. The second member is configured to pivot from a stored position where the free end is substantially adjacent to the first member to a deployed position where the free end is rotated away from the first member thereby increasing the separation between the first and second pannier fixture points.

2 Claims, 16 Drawing Sheets

(56) References Cited

U.S. PATENT DOCUMENTS

| | | | |
|---|---|---|---|
| 8,074,852 B2 * | 12/2011 | Crum, Jr. | B62J 9/001 |
| | | | 224/432 |
| 8,079,560 B2 * | 12/2011 | Blackwell | B60R 11/00 |
| | | | 24/329 |
| 8,459,517 B2 * | 6/2013 | Lindloff | B62J 7/04 |
| | | | 224/413 |
| 8,505,972 B2 * | 8/2013 | Nishiyama | B62J 1/28 |
| | | | 224/412 |
| 2009/0206624 A1 | 8/2009 | Mann | |

FOREIGN PATENT DOCUMENTS

| | | | |
|---|---|---|---|
| GB | 684979 A | 12/1952 | |
| GB | 730586 A | 5/1955 | |
| WO | 8304230 A1 | 12/1983 | |

OTHER PUBLICATIONS

European Search Report issued by EPO in connection with EP18196679 dated Feb. 27, 2019.

* cited by examiner

PANNIER MOUNT

FIELD OF THE INVENTION

The invention relates to a pannier mount assembly for a motorcycle that enables the attachment of a pannier to the motorcycle.

BACKGROUND

Motorcycles have a limited amount of space for storing luggage and typically utilise rear side-mounted packs (panniers) mounted on frames or supports to transport luggage. Motorcycles may be supplied with pannier frames that enable the attachment of panniers which straddle the rear frame of the motorcycle. Panniers are attached to pannier frames at attachment points that are both horizontally and vertically separated in order to reduce vibration, and, to provide a secure attachment. This means that pannier frames are usually quite large and often substantially cover the rear wheel of a motorcycle.

It is desirable for frames and panniers to be less visible when not in use to ensure favourable aesthetics and aerodynamics. Furthermore, it is desirable for panniers to be detachable in order to maximise practicality of the motorcycle when less storage capacity is required. For example, it may be possible for a passenger to be transported on the rear (pillion) seat of a motorcycle when panniers are detached.

One solution has been to detach an entire pannier rack when it is not required. However this is typically difficult and time-consuming. Collapsible panniers are discussed in U.S. Pat. Nos. 7,025,236B1 and 3,934,770A, However these have several disadvantages. For example, the shape of the pannier is limited to being rectangular which negatively impacts the aesthetics and aerodynamics of the motorcycle. The storage provided is fixed and not configurable without replacing the entire collapsible device (in other words it is not possible to easily use alternative panniers). Furthermore, there remains a substantial side and rear profile of the pannier when the pannier is in a collapsed state.

The present invention has been devised with the foregoing in mind.

SUMMARY OF THE INVENTION

According to a first aspect of the invention there is provided a pannier mount assembly for attachment to a motorcycle frame. The pannier mount assembly comprises a first member attachable to the frame, the first member comprising a first pannier fixture point. The pannier mount assembly also comprises a second member comprising an elongate arm pivotably attached to the first member and comprising a second pannier fixture point. The second member has a free end. The second member is configured to pivot from a stored position where the free end is substantially adjacent to the first member to a deployed position where the free end is rotated away from the first member thereby increasing the separation between the first and second pannier fixture points.

The first member may comprise an elongate arm.

The elongate arm of the second member may be pivotably attached at a pivot point proximal an end of the first member.

The elongate arm of the second member may extend from the free end to a non-free end and be pivotably attached to the first member at a pivot point proximal the non-free end.

The second pannier fixture point may comprise at least one pannier connector located on the second member.

At least one pannier connector of the second pannier fixture point may be located proximal to the free end of the second member.

The first pannier fixture point may comprise one or more pannier connectors.

The connectors may comprise any device for connecting a pannier to the pannier mount such as a pin, hook, coupler, catch, hasp, clasp, link etc.

The first pannier fixture point may comprise two pannier connectors, each pannier connector being located proximal opposing ends of the first member.

The elongate arm of the second member may be configured to pivot about an axis substantially parallel to an axis of rotation of a motorcycle wheel attached to the motorcycle frame.

When the second member is in the stored position, the pannier mount assembly is reduced in size and less visible. This means that the aesthetics of the motorcycle are improved when the pannier mount assembly is not required (i.e. when a pannier is not used). Furthermore, since the second member is stored substantially adjacent to the first member, the air flow around the pannier mount assembly may be less turbulent leading to improved aerodynamics and motorcycle performance.

When the second member is in the deployed position, it is possible to mount a pannier very securely since the separation between the fixture points is increased. This reduces the risk of unfavourable vibration and permits greater loads to be carried in the pannier.

According to some embodiments of the invention, pannier connectors are used to connect a pannier to the pannier mount. In order to ensure the pannier is securely attached to the pannier mount with a minimal risk of vibration, it is desirable for the pannier connectors to be separated in two dimensions. The position of at least one connector on the second member provides for a connector to be spaced apart from any other connectors that may be on the first member thereby ensuring that there is separation in two dimensions. This separation is advantageously increased as the second member is pivoted to a deployed position. Positioning any pannier connectors of the second pannier fixture point proximal to the free end of the second member further increases separation between all the pannier connectors in two dimensions.

It is desirable to minimise the number of connectors in order that it is easy to attach a pannier. For example, there may only be three connectors which is the minimum number required so that the connectors are spaced apart in two dimensions. There may be two connectors on the first member spaced apart along one dimension. A third connector may be provided on the second member. When the second member is deployed, the three connectors are located in two dimensions.

The pannier mount assembly may further comprise a detent biasing means (or biased detent) fixed to the first member. The detent biasing means may be biased to urge a detent into contact with the surface of the second member whilst allowing rotation of the second member. Alternatively, the detent is biased to be urged into contact with the surface of the second member.

The detent biasing means may comprise a spring. The detent may be biased by a spring. The detent may be biased by a flexible portion of the first member.

The second member may comprise a detent recess for receiving the detent when the second member is in the deployed position. The detent may be biased to be urged into the detent recess so that rotation of the second member out of the deployed position is resisted.

The detent recess may be configured to conform with a portion of the surface of the detent.

The detent may be a detent roller, and optionally, the detent roller may be a cylindroid, cylinder, or a sphere such as a ball bearing.

The detent spring provides for the rotation of the second member to be manually configured in a user-friendly and simple manner. The second member may be rotated using manual motion. Resistance of rotation away from the deployed position caused by the urging of the detent into the detent recess provides for undesirable rotation/vibration to be minimised. Furthermore, a user will be able to determine when the second member is in the correct deployed position by feeling the onset of resistance due to the urging of the detent into the detent recess. It remains possible for a user to manually overcome this resistance when initiating rotation of the second member away from the deployed position by using a higher amount of manual force.

In an alternative embodiment, the detent biasing means (or the biased detent) may be fixed to the second member and be biased to urge the detent into contact with the surface of the first member whilst allowing rotation of the first member. The first member may correspondingly comprise the detent recess for receiving the detent when the second member is in the deployed position.

The second member may be retained in the stored position by a connector for detachably connecting the second member to the first member. The connector may be a retaining clip. The retaining clip may be attached to the first member and receive a retaining lug, the retaining lug being on the second member. Alternatively, the retaining lug may be on the first member and receive the retaining clip, the retaining clip being attached to the second member. The second member may be retained in the stored position by securing the retaining lug to the retaining clip.

The first member may comprise an integrated stopping surface configured to impinge with the surface of the second member when the second member is in the deployed position, thereby preventing the second member from rotating beyond the deployed position.

The second member may further comprise a protruding edge configured to prevent attachment of a pannier to the pannier mount assembly when the second member is in the stored position.

The first member may be attachable to a rear frame of a motorcycle.

The first member may comprise an assembly of one or more components. The one or more components may be three components that include an elongate arm and front and rear attachment components. The front and rear attachment components may be each configured for attachment to the rear frame of a motorcycle. Using multiple components for assembly of the first member improves manufacturability.

The second member may point towards the ground when in the deployed position.

The first member may be attachable to an underside of the motorcycle frame.

It is advantageous to prevent attachment of a pannier when the second member is not deployed in order to ensure that a user does not inadvertently attach the pannier without support provided by second pannier fixture means on the second member. This would result in the pannier not being adequately attached and susceptible to instability/vibration.

According to a second aspect of the invention there is provided a method of securing a pannier to a pannier mount assembly attached to a motorcycle frame. The method comprises the steps of:
providing a pannier mount assembly comprising a first member and a second member, the second member comprising an elongate arm pivotably attached to the first member, the first member comprising a first pannier fixture point, and the second member comprising a second pannier fixture point;
pivoting the second member from a stored position where a free end of the second member is substantially adjacent to the first member, to a deployed position where the free end is rotated away from the first member thereby increasing the separation between the first and second pannier fixture points;
attaching a pannier to the pannier mount assembly via the first and second pannier fixture points.

The method may further comprise the steps of:
providing a biased detent fixed to the first member, the detent being biased to be urged into contact with the surface of the second member;
providing a detent recess in the second member for receiving the detent when the second member is in the deployed position; and
resisting rotation of the second member out of the deployed position.

The method may further comprise the step of rotating the second member towards the ground to place the second member in the deployed position.

The method may further comprise the step of rotating the second member about an axis substantially parallel to an axis of rotation of a motorcycle wheel attached to the motorcycle frame.

According to a third aspect of the invention there is provided a pannier mount assembly for attachment to a motorcycle frame, the pannier mount assembly comprising:
a first member attachable to the frame and comprising first pannier fixture point; and
a second member pivotably attached to the first member and comprising second pannier fixture point, the second member having a free end;
a biased detent fixed to the first member, the detent biased to be urged into contact with the surface of the second member,
wherein:
the second member is configured to pivot from a stored position where the free end is substantially adjacent to the first member to a deployed position where the free end is rotated away from the first member thereby increasing the separation between the first and second pannier fixture points.

DETAILED DESCRIPTION

Figure 1:
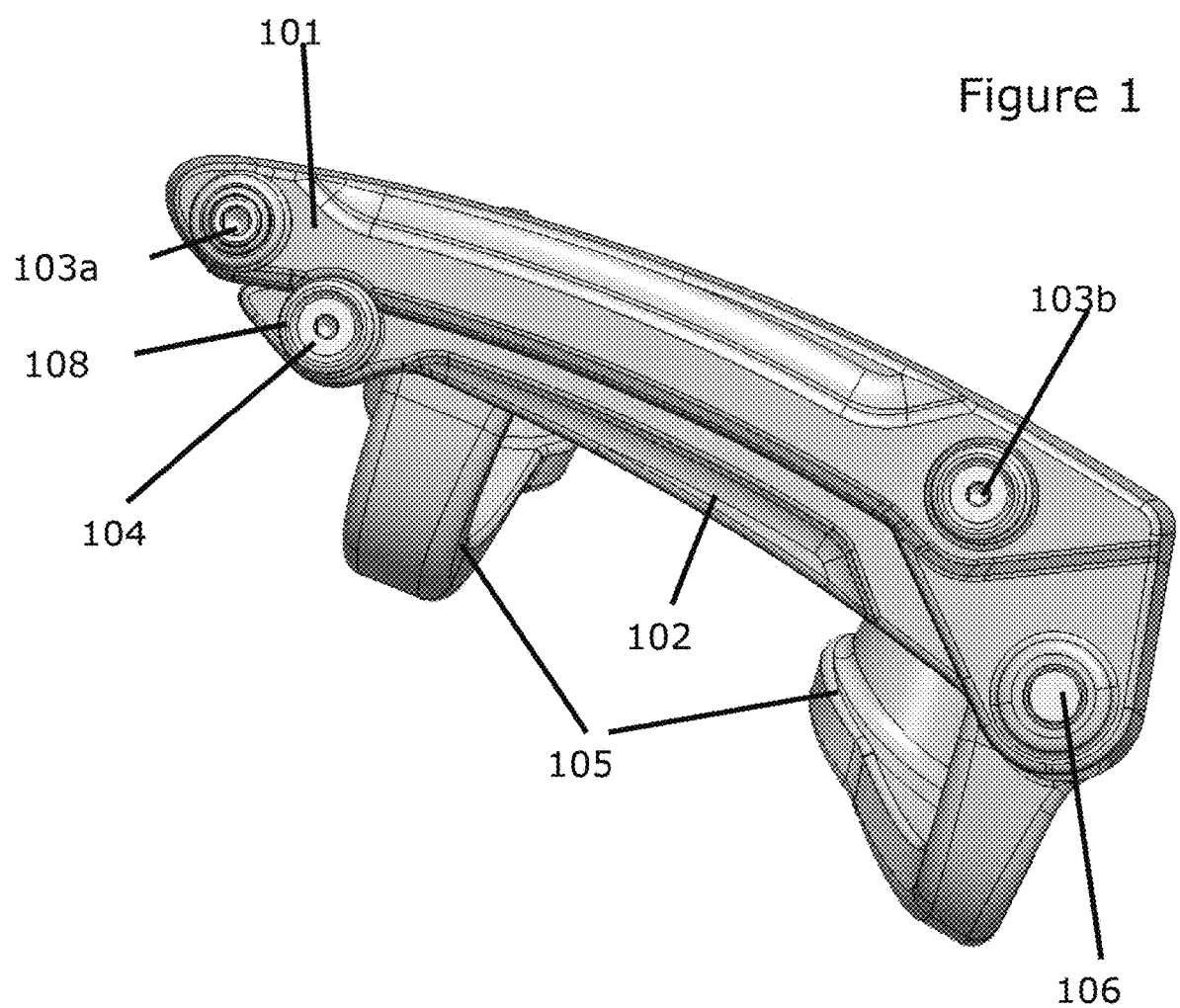
FIG. 1 shows a side view of a pannier mount assembly in accordance with an embodiment of the invention when a second member is in the stored position.
Figure 2:
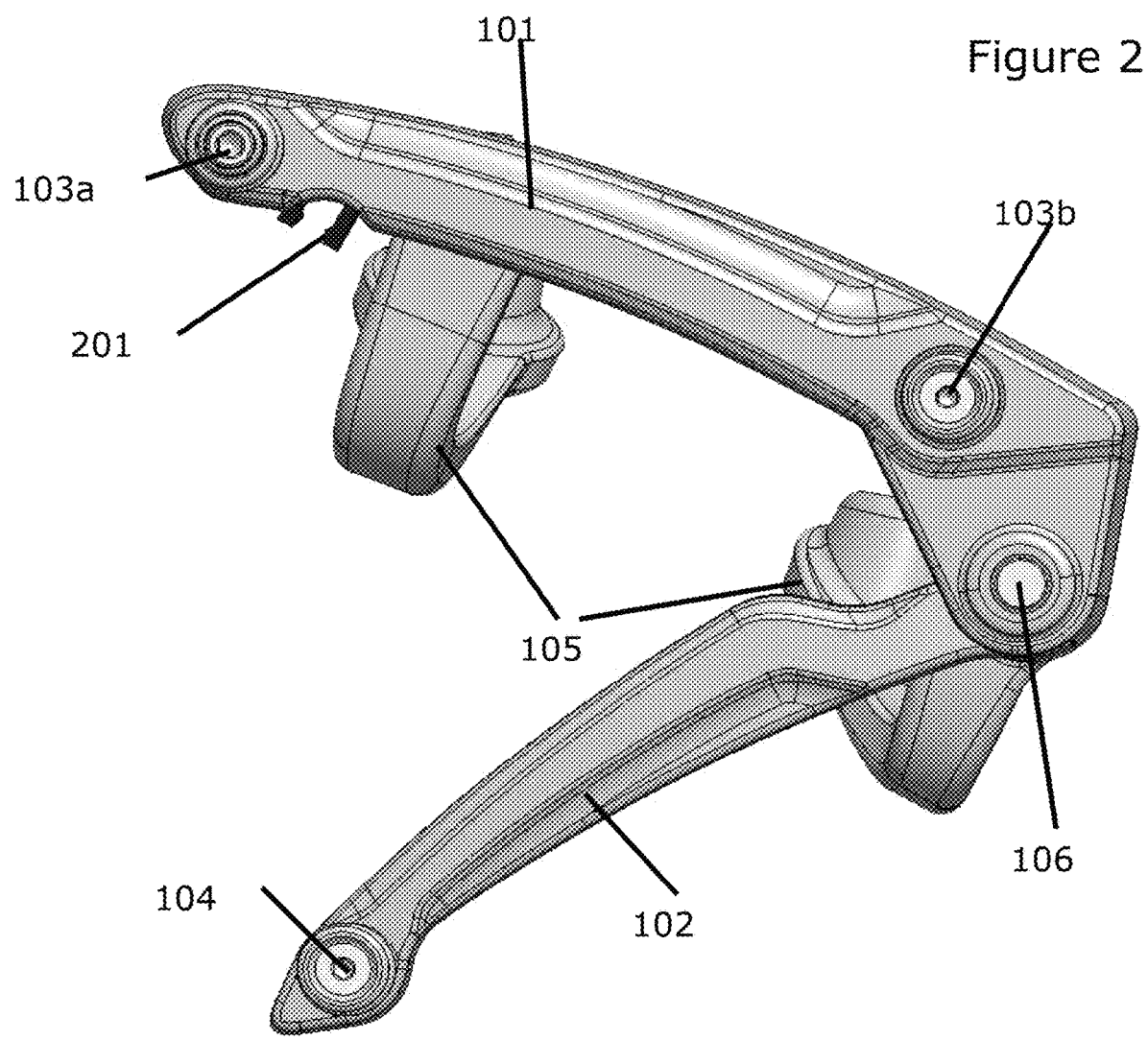
FIG. 2 shows a side view of the pannier mount assembly of FIG. 1 when the second member is in the deployed position.

With reference to FIGS. 1 and 2 there is shown a side view pannier mount assembly in accordance with an embodiment of the claimed invention. There is a first member 101 pivotably attached to second member 102. The second member 102 is rotatable via pivot pin 106 or other rotation mechanism about a fixed axis. The first member 101 comprises frame fixture components 105 for attachment to the rear frame of a motorcycle. Two pannier fixture points 103a and 103b are located on the first member 101. A single pannier fixture point 104 is located near the free end of the second member 102. It will be appreciated that in embodiments there may be multiple pannier fixture points located on the second member 102. Protruding edge 108 is situated on second member 102.

FIG. 1 shows a view of the pannier mount assembly when the second member 102 is in the stored position. In this position, the second member 102 has been rotated so that the free end is adjacent to the first member. It can be seen that the second member is minimally visible when it is in the stored position. In the shown embodiment, the first member 101 partially overlaps the second member 102 when in the stored position. Therefore, the visibility of the second member 102 in this position is further reduced.

Protruding edge 108 serves to prevent a pannier from being attached to the pannier mount assembly when the second member 102 is in the stored position. For example a user may understand incorrectly that a pannier (not shown) can be attached using only pannier fixture points 103a and 103b. Such attachment is prevented since it is not possible to obtain a secure connection with only two connections to the pannier mount via pannier fixture points 103a and 103b.

FIG. 2 shows a view of the pannier mount assembly when the second member 102 is in a deployed position. In this position, a pannier (not shown) may be attached to the pannier mount assembly via pannier connection points 103a, 103b, and 104. A retaining clip 201 is attached to first member 101. It can be seen that the free end of the second member 102 (and therefore pannier fixture point 104) has been extended away from the first member 101. This provides for the pannier fixture points 103a, 103b, 104 to be separated by a greater degree in two dimensions compared to when the second member 102 is in the stored position. In turn, this provides for a pannier to be securely fitted to the pannier mount assembly using the pannier fixture points to attach a compatible pannier that comprises corresponding fixture points.

Figure 3:
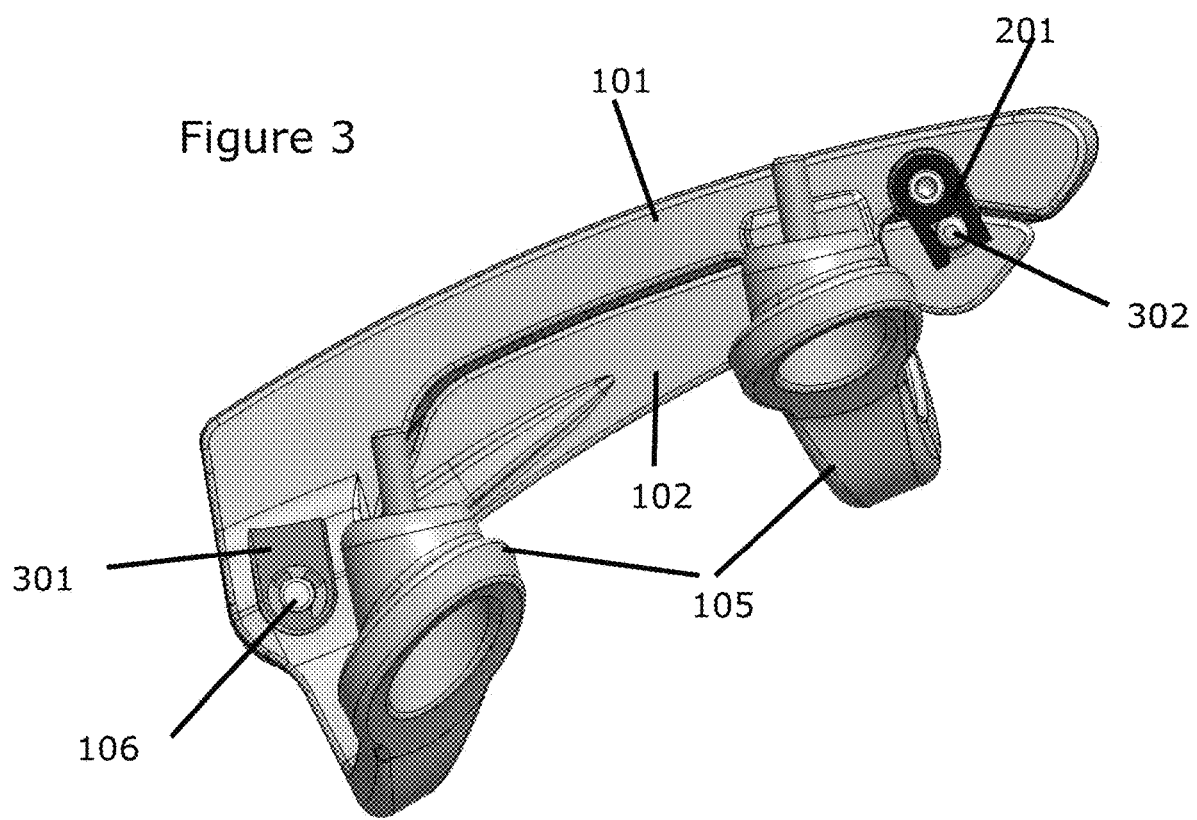
FIG. 3 shows a perspective view of the pannier mount assembly of FIG. 1 when the second member is in the stored position.

With reference to FIG. 3 there is shown a circlip 301 and the retaining clip 201 attached to first member 101. A lug 302 is attached to second member 102 at a position proximal to the free end of second member 102. All other referenced features are as above with respect to FIGS. 1 and 2.

The circlip 301 secures the pivot pin 106 in place. It will be appreciated that a circlip may not be required if another rotation mechanism about a fixed axis are used instead of the pivot pin 106. The retaining clip 201 is used to secure the second member 102 in the stored position as shown. The retaining clip functions by receiving the lug 302 when the second member 102 is manually rotated to the stored position. The second member 102 is secured in the stored position since the flexural stiffness of the retaining clip 201 retains the lug 302. In embodiments, this may be a snap-fit fixture. It is possible to disengage the lug from the retaining clip by manually exerting a rotational force on the second member 201.

Alternatively, the retaining clip 201 may be attached to the second member 102 and lug 302 may be attached to the first member 101. In this case the lug will receive the retaining clip when the second member 102 is manually rotated to the stored position.

Figure 4:
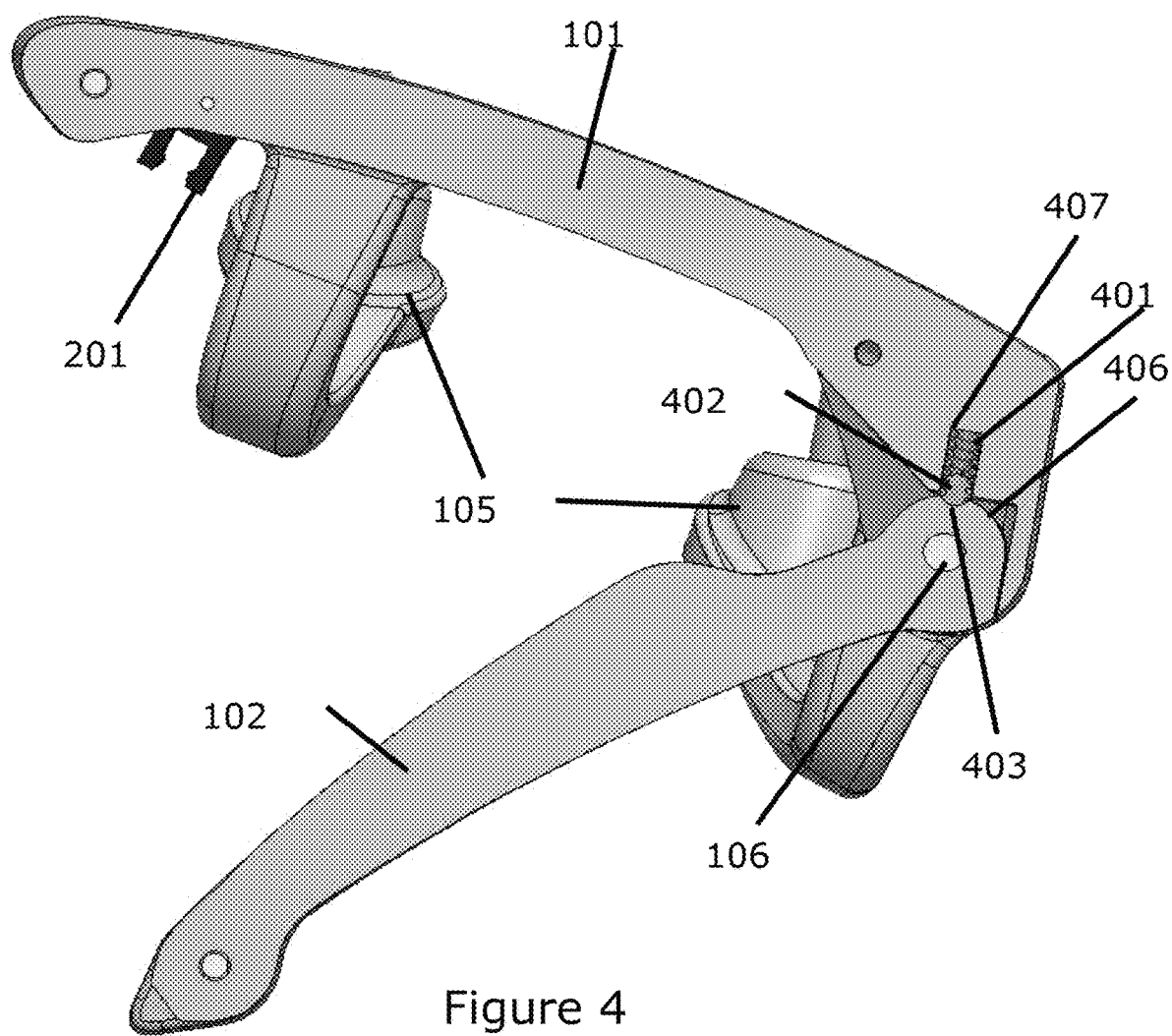
FIG. 4 shows a cross-sectional side view of the pannier mount assembly of FIG. 1.
Figure 5:
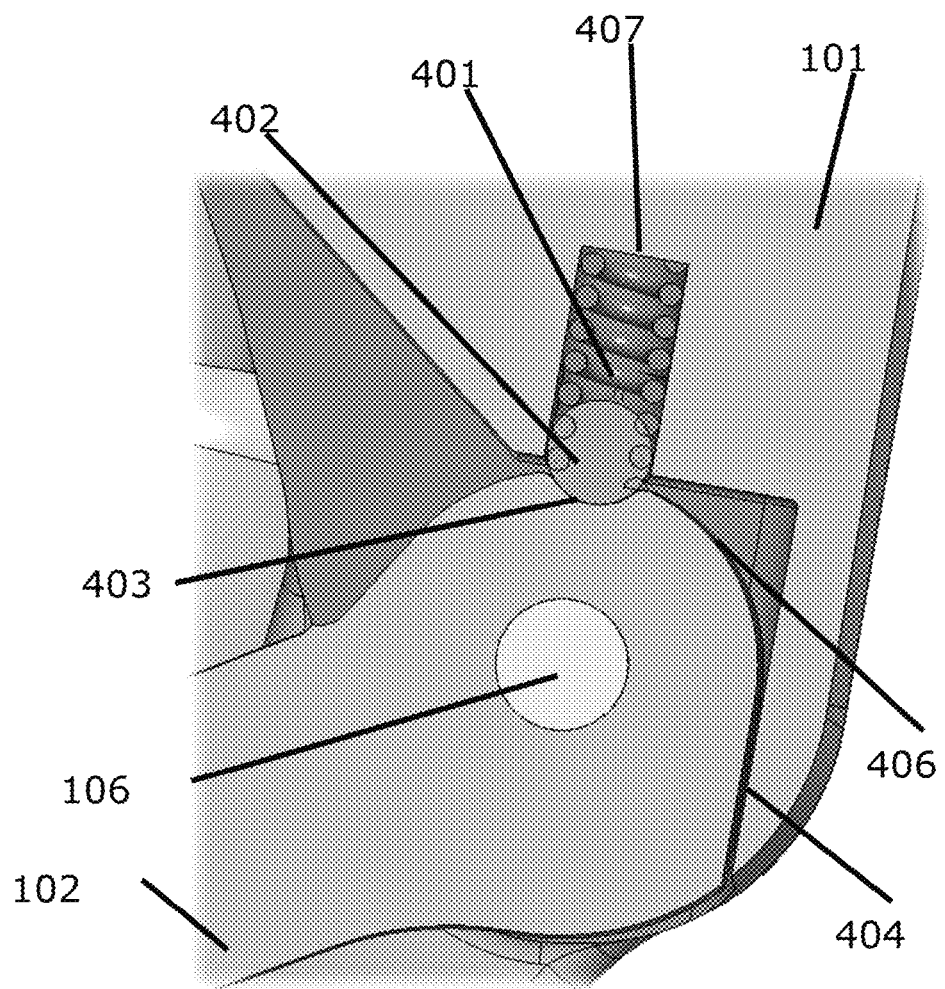
FIG. 5 shows a magnified cross-sectional side view of a section of the pannier mount assembly of FIG. 1.

With reference to FIGS. 4 and 5 there is shown a cross-sectional view of the pannier mount assembly with emphasis on a mechanism used to help secure the second member when in the deployed position. A detent spring 401 is fixed to first member 101 within a chamber 407. A detent roller 402 is situated in between (and is in contact with) detent spring 401 and a curved surface 406 of second member 102. When the second member 102 is in the deployed position, the detent roller 403 is seated in a roller recess 403 being a portion of the curved surface 406 that is shaped to partially receive and conform to the surface of detent roller 403. In the shown embodiment, the detent roller has a cylindrical shape. Roller 402 always partially sits within the chamber 407 and abuts with walls of chamber 407 so that it remains in contact with spring 401. First member 101 comprises a stopping surface 404 that conforms with and abuts first member 102 when in the deployed position.

The detent spring 401, detent roller 402, and roller recess 403 serve to resist rotation of the second member 102 in any direction when the second member is in the deployed position as shown in FIGS. 4 and 5.

The detent spring 401 is biased to urge the detent roller 402 to exert a force on second member 102. When the second member 102 is rotated through positions that do not include the deployed position, a minimal amount of rotational resistance is provided by the detent spring and roller. For such rotation, the roller 402 will rotate and the compression of detent spring 401 is not substantially altered.

When the second member 102 is placed in the deployed position (as shown in FIGS. 4 and 5), the detent roller 402 is urged by the spring 401 into the roller recess 403. The roller recess 403 may comprise a profile on the curved surface 406 of second member 102 that conforms to the shape of the detent roller 402. In this deployed position, the compression of detent spring 401 is reduced. Rotation of the second member 102 away from the deployed position requires increased compression of detent spring 401 in order to allow detent roller 402 to be released from roller recess 403. This means that rotation of second member 102 away from the deployed position is resisted due to additional force required to increase compression of detent spring 401. In other words, there is a substantial rotational resistance provided by the detent spring 401 and roller 402 when rotating the second member 102 away from the deployed position. However the spring constant of detent spring 401 is such that second member 102 may be manually rotated away from the deployed position.

The figures show an embodiment where the detent roller 402 is a cylinder. However alternatively shaped rollers may be used in embodiments. For example, the roller may be a spherical shaped object or a cylindroid.

Furthermore, it will be appreciated that the invention may comprise a detent instead of a detent roller, for example the may be a profiled portion that does, or does not rotate.

The biasing force provided by spring 401 may be provided by an alternative biasing means.

Figure 6:
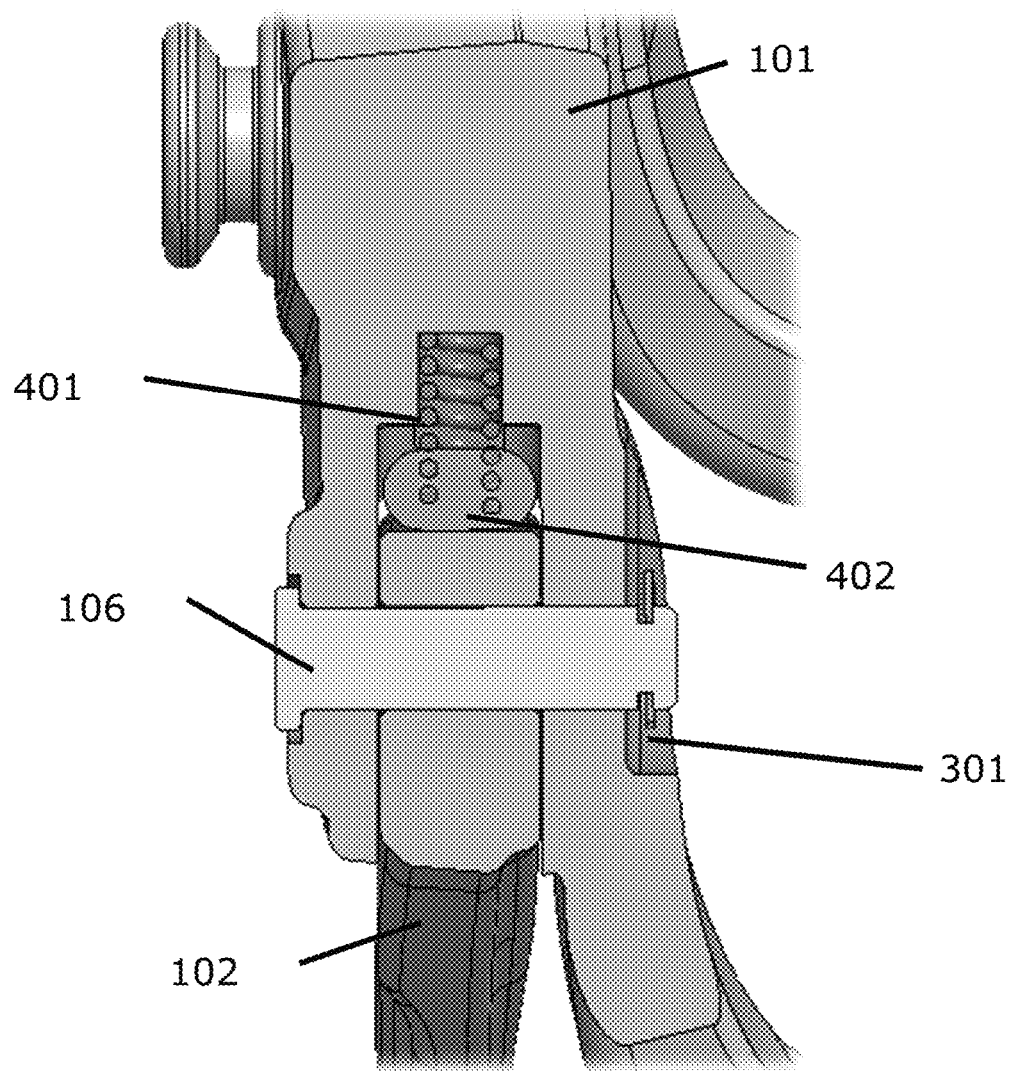
FIG. 6 shows a cross sectional view of the pannier mount assembly of FIG. 1, the cross-sectional plane being referenced by line A in FIG. 7.
Figure 7:
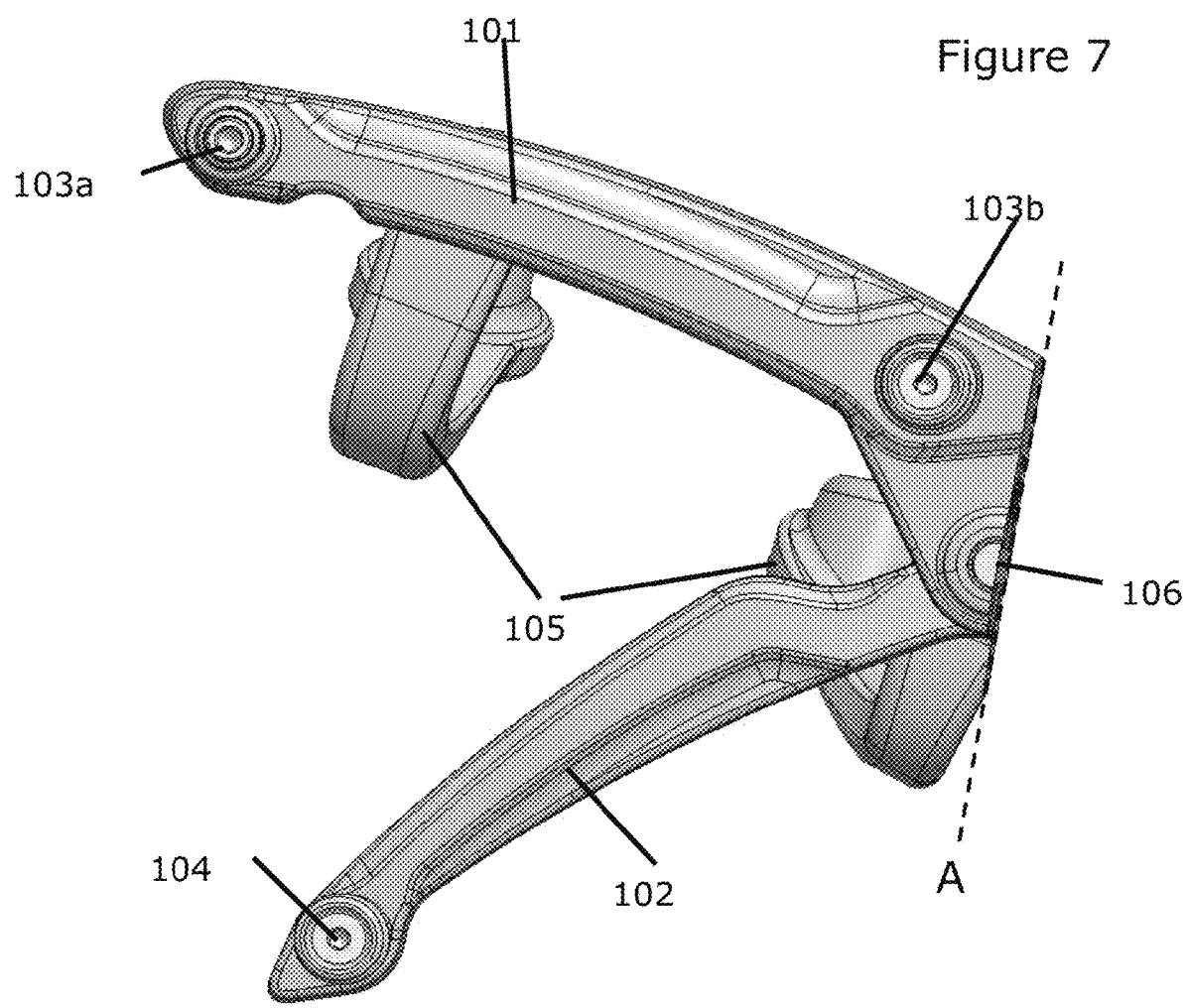
FIG. 7 shows a side view of the pannier mount assembly of FIG. 1 indicating the cross-sectional plane from which the cross-sectional view of FIG. 6 is taken.

With reference to FIG. 6 there is shown a cross-sectional view of the pannier mount assembly through the plane indicated by line A in FIG. 7. References to features in FIGS. 6 and 7 relate to the same features as discussed with reference to FIGS. 1 to 5.

Figure 8:
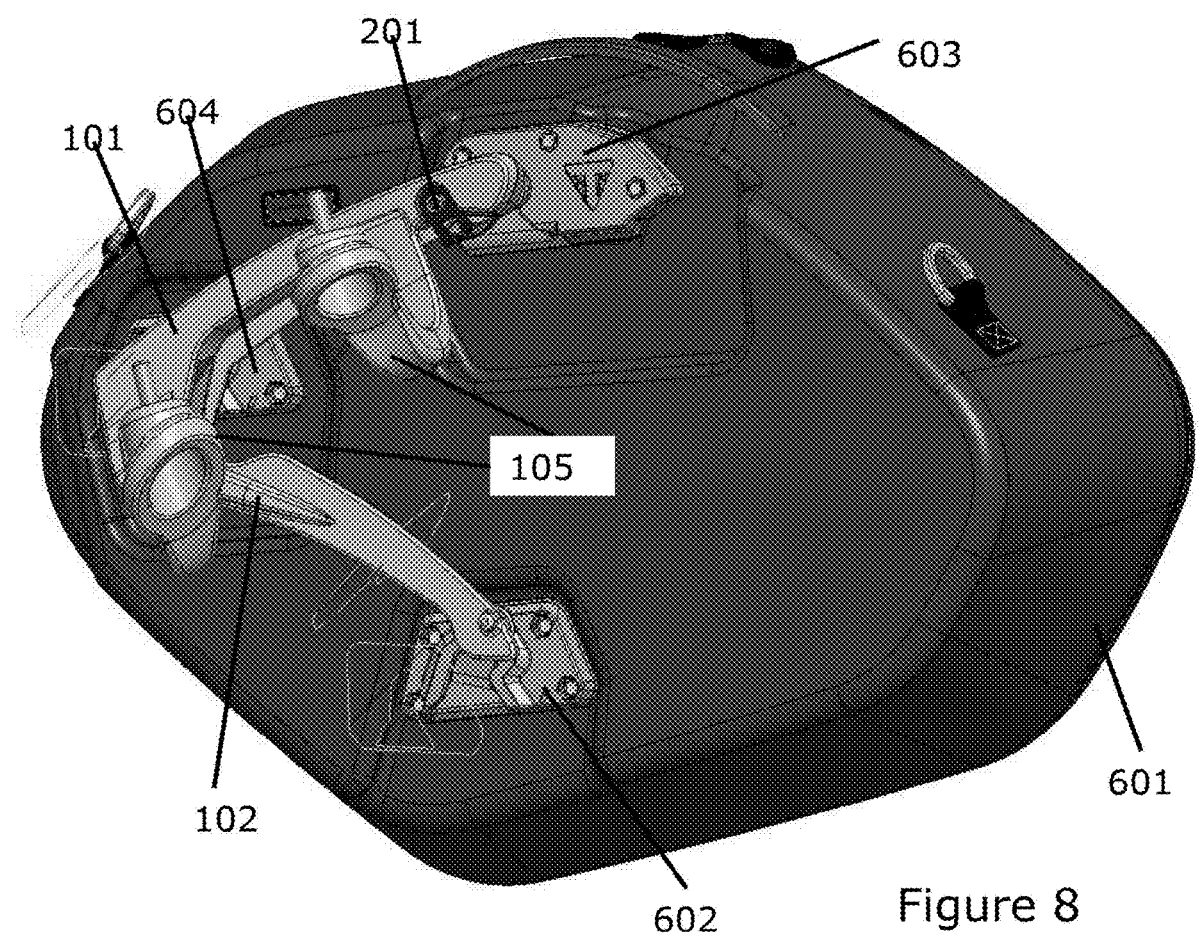
FIG. 8 shows a perspective view of the pannier mount assembly of FIG. 1 showing a pannier fitted to the pannier mount assembly.
Figure 9:
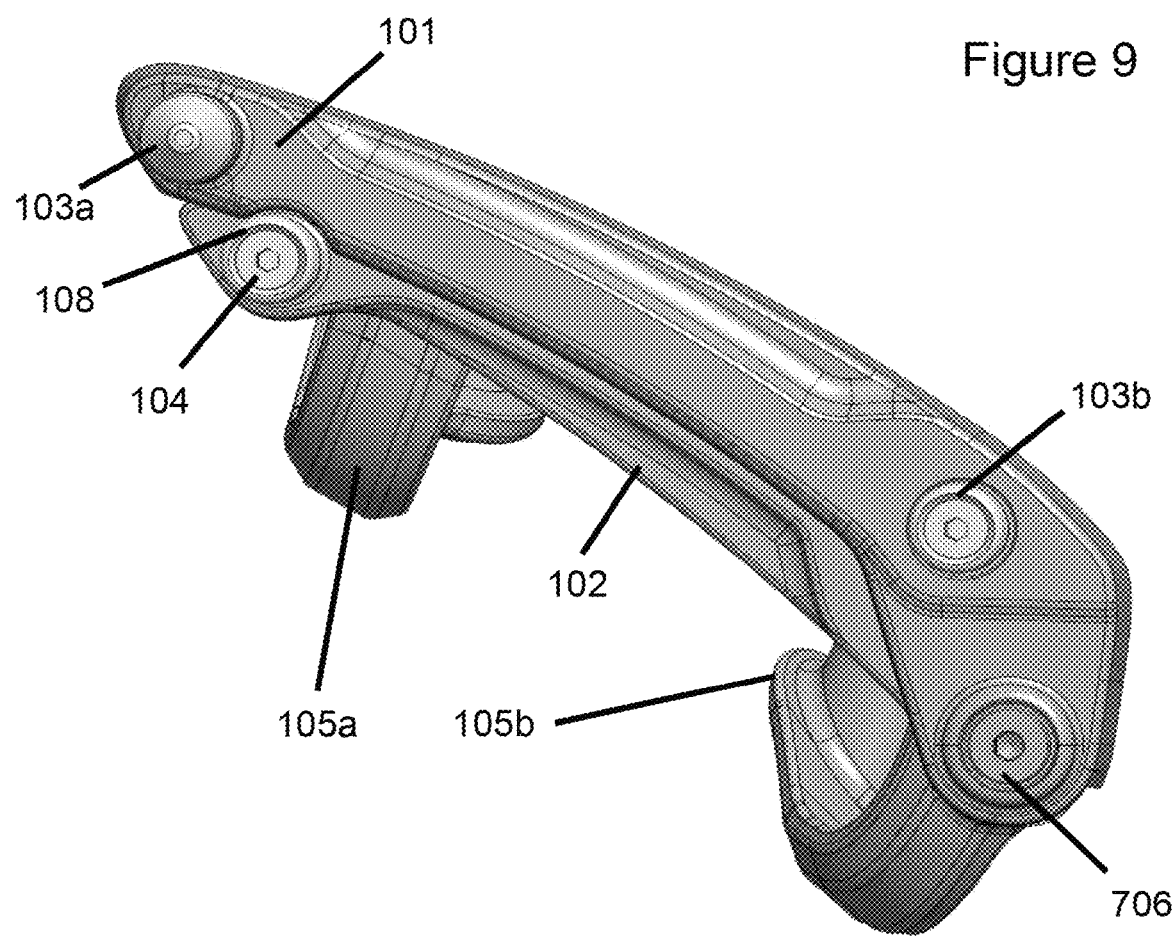
FIG. 9 shows a side view of a pannier mount assembly in accordance with an embodiment of the invention when a second member is in the stored position.
Figure 10:
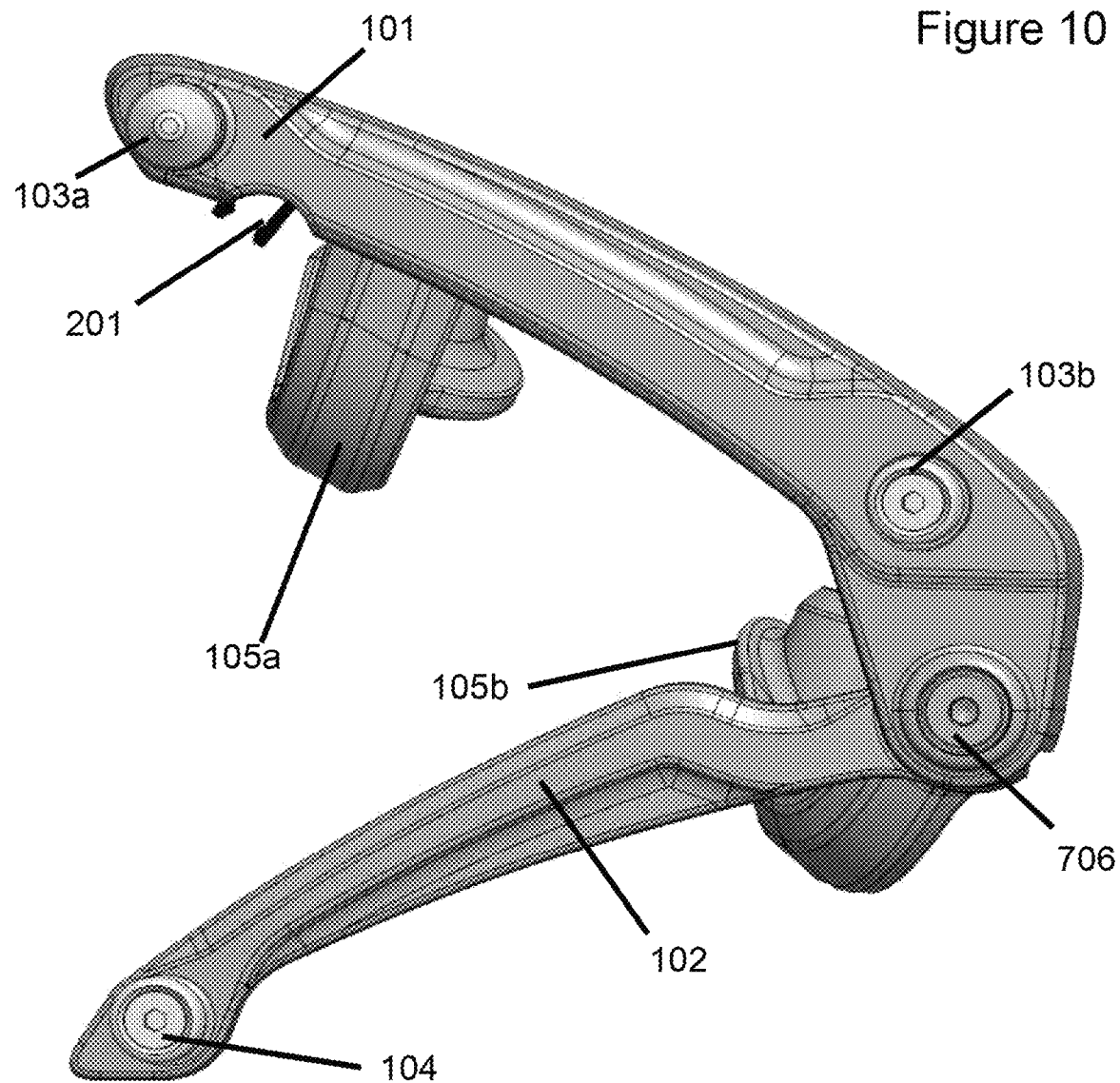
FIG. 10 shows a side view of the pannier mount assembly of FIG. 9 when the second member is in the deployed position.
Figure 11:
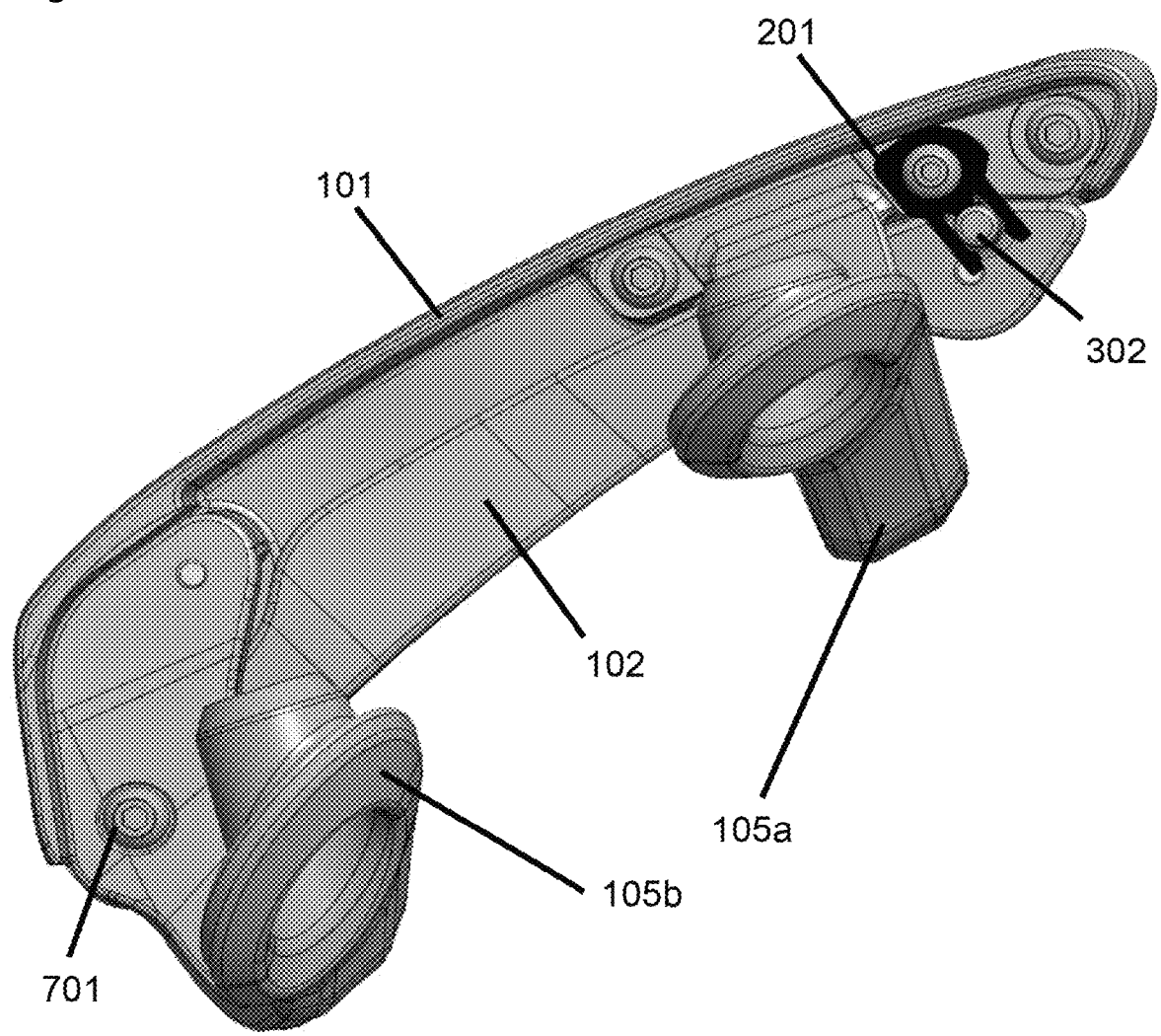
FIG. 11 shows a perspective view of the pannier mount assembly of FIG. 8 when the second member is in the stored position.
Figure 12:
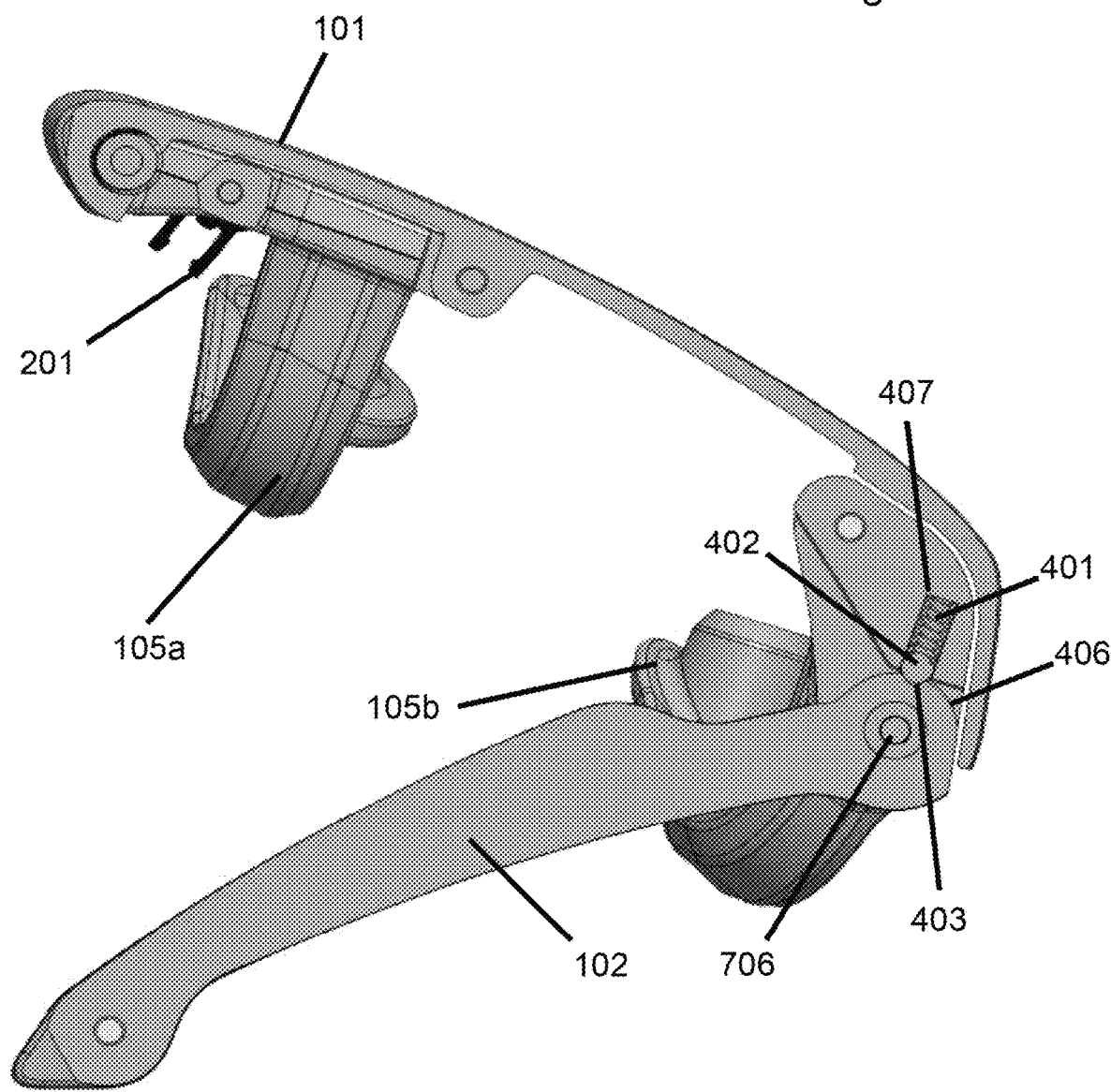
FIG. 12 shows a cross-sectional side view of the pannier mount assembly of FIG. 8.
Figure 13:
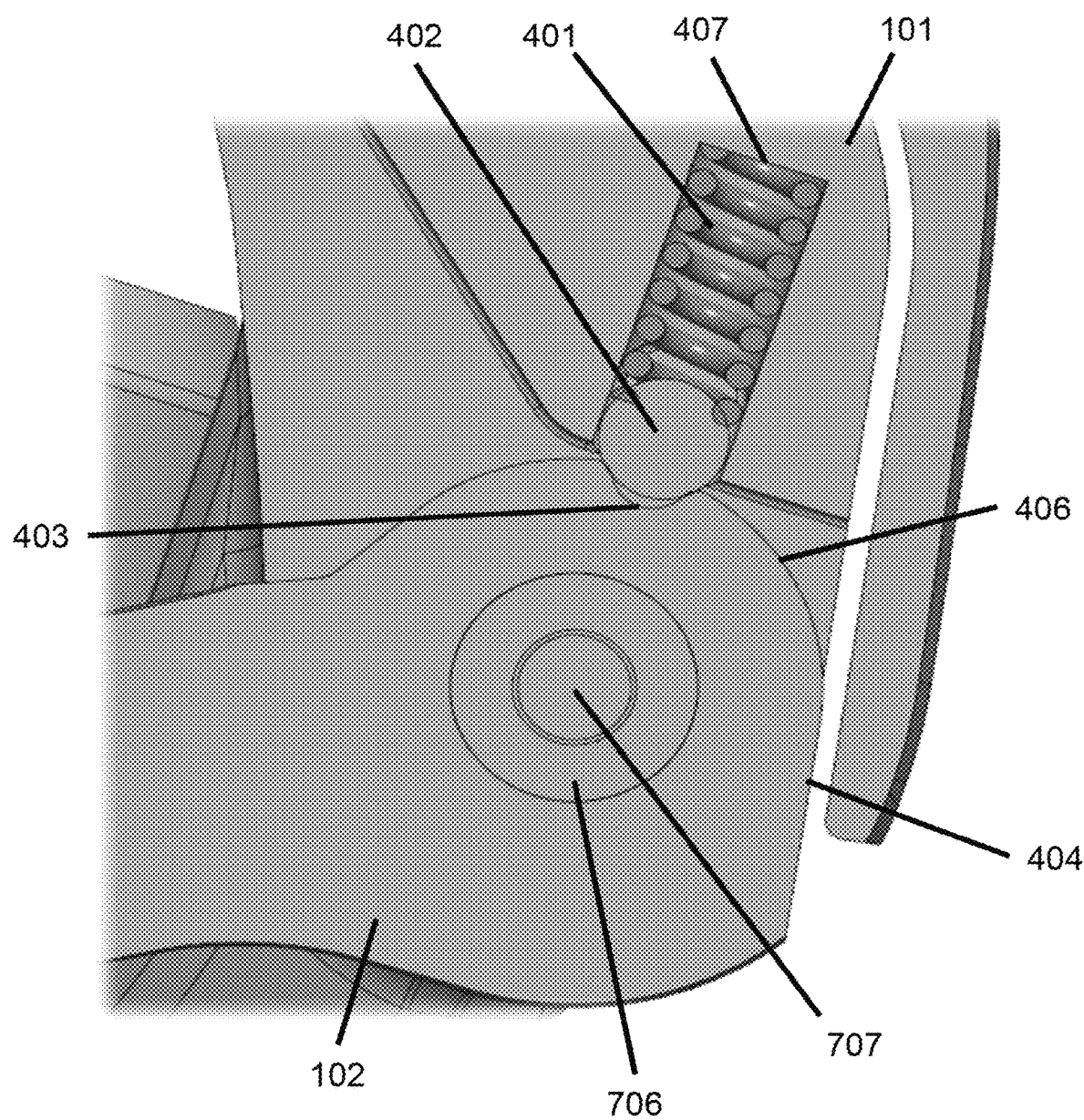
FIG. 13 shows a magnified cross-sectional side view of a section of the pannier mount assembly of FIG. 8.
Figure 14:
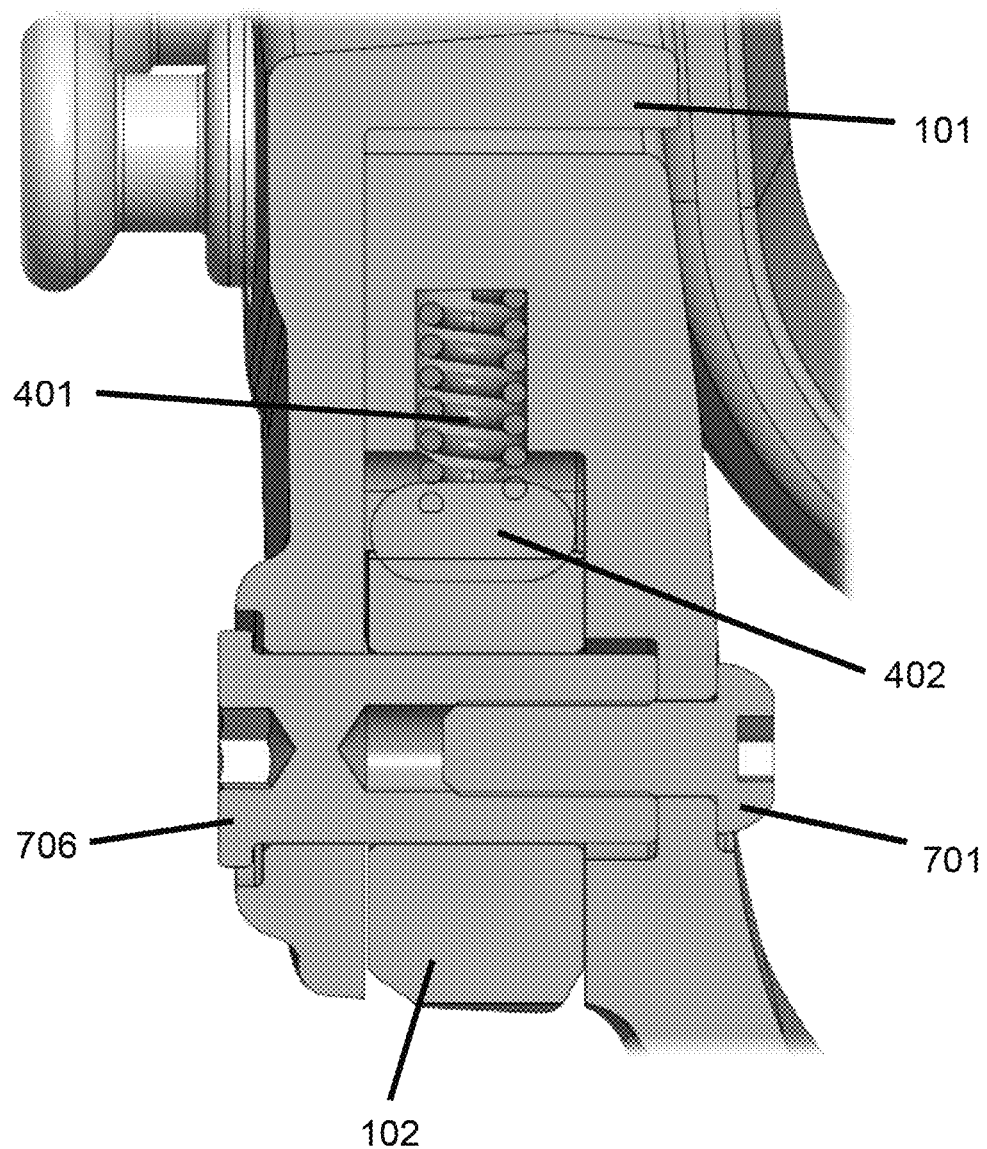
FIG. 14 shows a cross sectional view of the pannier mount assembly of FIG. 8, the cross-sectional plane being referenced by line A in FIG. 15.
Figure 15:
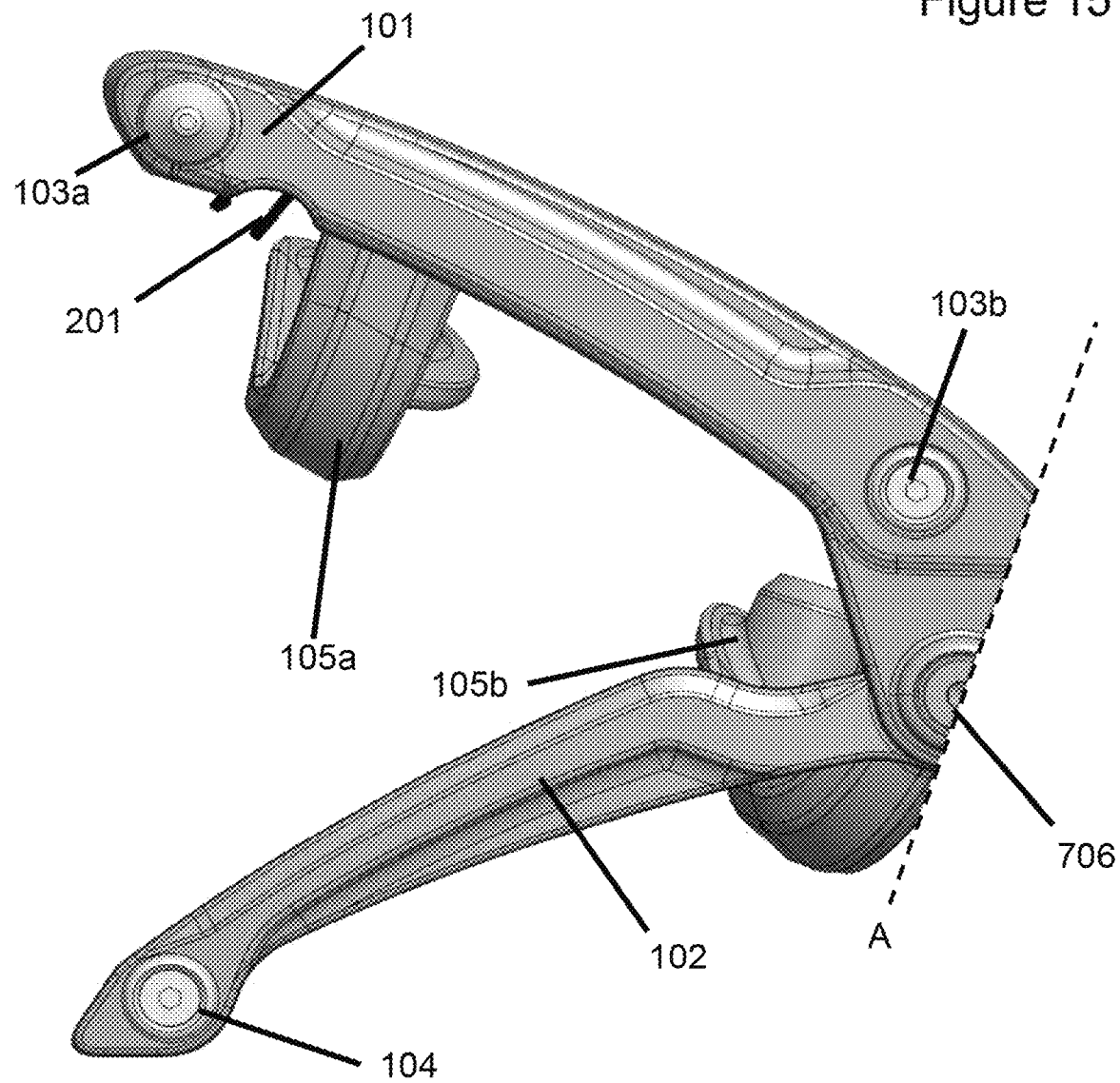
FIG. 15 shows a side view of the pannier mount assembly of FIG. 8 indicating the cross-sectional plane from which the cross-sectional view of FIG. 14 is taken.
Figure 16:
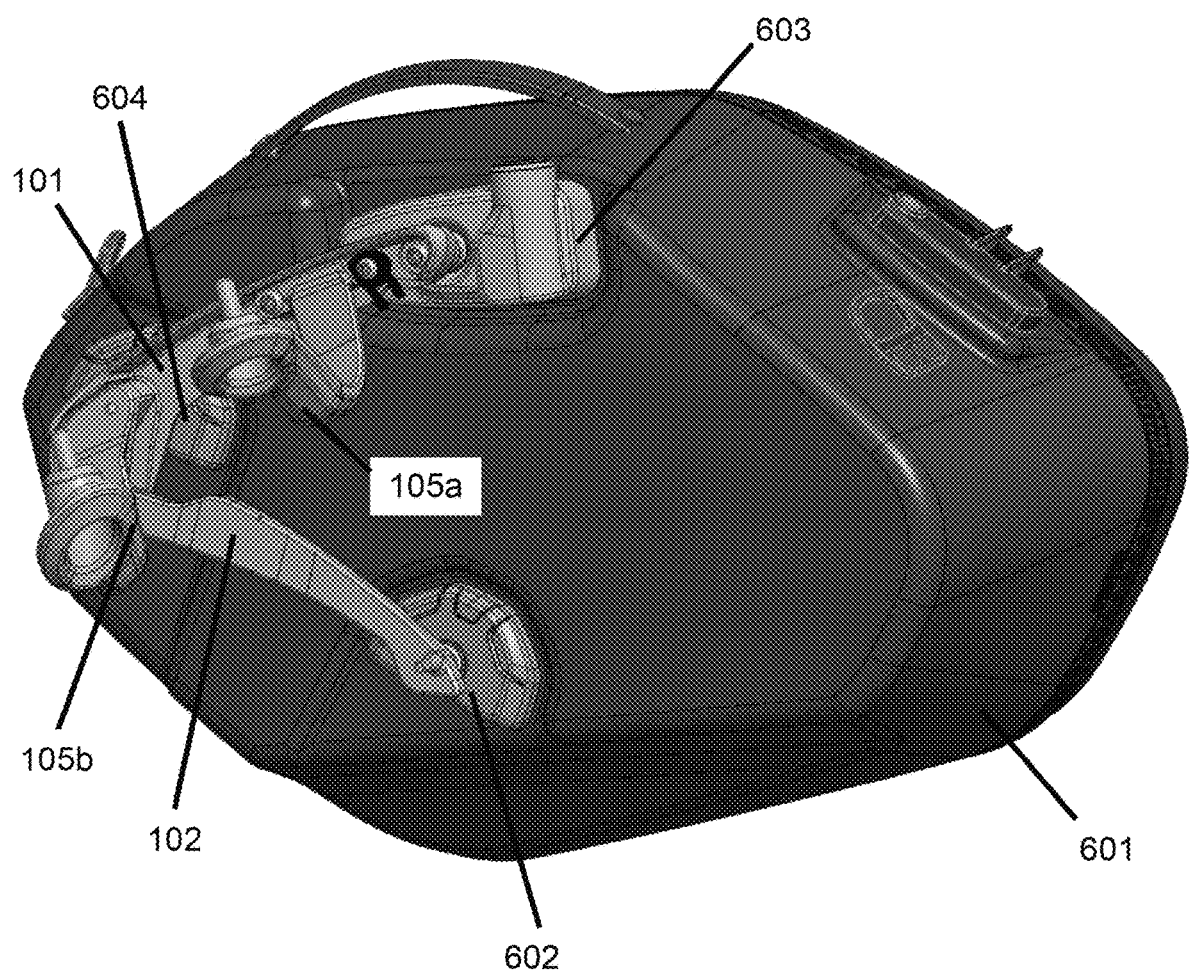
FIG. 16 shows a perspective view of the pannier mount assembly of FIG. 8 showing a pannier fitted to the pannier mount assembly.

With reference to FIG. 8 there is shown the pannier mount assembly attached to a pannier 601 via corresponding fixture points 602, 603, 604. These fixture points are positioned on the pannier 601 such that they correspond with the pannier fixture points on the pannier mount assembly when the second member 102 is in the deployed position. The pannier 601 may be lockable to the pannier mount assembly. Remaining reference numerals relate to features as discussed with reference to the other figures.

In use, a user may attach and detach a pannier 601 to the pannier mount assembly when the second member 102 is in the deployed position. When the pannier 601 is detached, the user manually rotates second member 102 into the stored position as shown in FIG. 1. The second member 102 therefore becomes substantially hidden, thereby improving aesthetics and the aerodynamics of the motorcycle. When the user wishes to re-attach a pannier, he manually rotates the second member 102 into the deployed position and attaches the pannier 601 to the pannier mount assembly as shown in FIG. 8.

In the embodiment shown, the pannier mount assembly is designed for mounting on a rear frame of a motorbike, so that the second member partially covers a rear wheel of the motorbike when in the deployed position. The second member is rotated towards the ground in order to be placed in the deployed position. However in other embodiments the second member may be rotated in different directions and the pannier mount assembly can be mounted at different positions on a motorcycle.

FIGS. 9 to 16 show an alternative pannier mount assembly according to this disclosure. The reference numerals refer to features as set out above with respect to FIGS. 1 to 8.

The pannier mount assembly of FIGS. 9 to 16 includes a front fixture component 105b, and a rear fixture component 105a. The fixture components are each attached to the first member 101 and are configured for attachment to the rear frame of a motorcycle. In other words, the fixture components 105 of FIGS. 1 to 8 are replaced with a front and rear fixture components in the disclosure of FIGS. 9 to 16. The front and rear fixture components may be detachable from the first member 101.

The pannier mount assembly of FIGS. 9 to 16 includes an alternative rotation mechanism for rotating the second member 102 (although this alternative rotation mechanism may be incorporated in a pannier mount assembly according to any aspect or embodiment disclosed herein). Instead of a pivot pin 106 as disclosed in FIGS. 1 to 8, the pannier mount assembly of FIGS. 9 to 16 includes a threaded boss 706 that receives a screw 701 (instead of a circlip 301 of FIGS. 1 to 8) for securing the pannier mount assembly together and providing for rotation of the second member 102. The alternative rotation mechanism improves manufacturability and assembly in this embodiment of the design.

The invention claimed is:

1. A method of securing a pannier to a pannier mount assembly attached to a motorcycle frame comprising the steps of:
providing a pannier mount assembly comprising a first member and a second member, the second member comprising an elongate arm pivotably attached to the first member, the first member comprising a first pannier fixture point, and the second member comprising a second pannier fixture point;
pivoting the second member from a stored position where a free end of the second member is substantially adjacent to the first member, to a deployed position where the free end is rotated away from the first member thereby increasing the separation between the first and second pannier fixture points; and
attaching a pannier to the pannier mount assembly via the first and second pannier fixture points,
wherein the elongate arm of the second member is configured to pivot about an axis substantially parallel to an axis of rotation of a motorcycle rear wheel attached to the motorcycle frame.

2. The method of claim 1 further comprising the step of rotating the second member towards the ground to place the second member in the deployed position.

* * * * *